United States Patent
Matsubara

(10) Patent No.: US 11,029,486 B2
(45) Date of Patent: Jun. 8, 2021

(54) MICROSCOPE AND OBSERVATION METHOD

(71) Applicant: FUJIFILM Corporation, Tokyo (JP)

(72) Inventor: Kenta Matsubara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 375 days.

(21) Appl. No.: 16/055,457

(22) Filed: Aug. 6, 2018

(65) Prior Publication Data
US 2018/0341083 A1   Nov. 29, 2018

Related U.S. Application Data

(63) Continuation of application No. PCT/JP2016/086151, filed on Dec. 6, 2016.

(30) Foreign Application Priority Data

Feb. 26, 2016 (JP) ............................. JP2016-035618

(51) Int. Cl.
  *G02B 7/28* (2021.01)
  *G02B 21/26* (2006.01)
  (Continued)

(52) U.S. Cl.
  CPC ............... *G02B 7/28* (2013.01); *G02B 7/36* (2013.01); *G02B 21/06* (2013.01); *G02B 21/241* (2013.01);
  (Continued)

(58) Field of Classification Search
  CPC .......... G02B 7/28; G02B 7/36; G02B 21/245; G02B 21/244; G02B 21/241;
  (Continued)

(56) References Cited

U.S. PATENT DOCUMENTS 6,677,565 B1  1/2004  Wahl et al.
10,649,192 B2 * 5/2020  Matsubara ............. G02B 21/14
(Continued)

FOREIGN PATENT DOCUMENTS

JP      2006-3543 A      1/2006
JP      2006003543 A  *  1/2006
(Continued)

OTHER PUBLICATIONS

Korean Notification of Reasons for Refusal for corresponding Korean Application No. 10-2018-7023736, dated May 7, 2019, with English translation.
(Continued)

*Primary Examiner* — Stephone B Allen
*Assistant Examiner* — Rahman Abdur
(74) *Attorney, Agent, or Firm* — Birch, Stewart, Kolasch & Birch, LLP

(57) ABSTRACT

A microscope includes an illumination light emission unit 10 that emits illumination light, a stage 61 on which a culture container 60 is placed, an objective lens 31 on which the illumination light having passed through the culture container 60 and the stage 61 is incident, a focusing light emission unit 70 that emits focusing light, a reflected light detection unit 75 that detects reflected light due to emission of the focusing light, a distance changing unit 34 that changes a distance between the objective lens 31 and the stage 61, an autofocus control unit 51 that performs autofocus control based on the reflected light, and a focus control information acquisition unit 53 that acquires focus control information including information of the culture container 60, the amount of culture solution C, and the magnification of the objective lens 31.

19 Claims, 4 Drawing Sheets

(51) Int. Cl.
  *G02B 7/36* (2021.01)
  *G02B 21/24* (2006.01)
  *G02B 21/06* (2006.01)
  *G03B 13/32* (2021.01)
  *H04N 5/232* (2006.01)

(52) U.S. Cl.
  CPC ......... *G02B 21/244* (2013.01); *G02B 21/245* (2013.01); *G02B 21/248* (2013.01); *G02B 21/26* (2013.01); *G03B 13/32* (2013.01); *H04N 5/23212* (2013.01)

(58) Field of Classification Search
  CPC ...... G02B 21/248; G02B 21/26; G02B 21/06; G02B 21/365; G02B 21/24; G03B 13/32; H04N 5/23212
  USPC .......................................................... 359/385
  See application file for complete search history.

(56) References Cited

U.S. PATENT DOCUMENTS

| | | | | |
|---|---|---|---|---|
| 2006/0078190 A1* | 4/2006 | Shibata | ................ | G06T 7/0004 382/149 |
| 2008/0204865 A1* | 8/2008 | Yoneyama | ............ | G02B 21/16 359/381 |
| 2009/0097734 A1* | 4/2009 | Fukuda | ............. | G01B 11/0625 382/133 |
| 2015/0015942 A1 | 1/2015 | Steinmeyer et al. | | |
| 2017/0003490 A1* | 1/2017 | Sueki | ....................... | G06T 7/60 |

FOREIGN PATENT DOCUMENTS

| | | |
|---|---|---|
| JP | 2008-15074 A | 1/2008 |
| JP | 2009-198525 A | 9/2009 |
| JP | 2009-282357 A | 12/2009 |
| JP | 2013-190680 A | 9/2013 |
| JP | 2015-18234 A | 1/2015 |

OTHER PUBLICATIONS

European Communication pursuant to Article 94(3) EPC for European Application No. 16891643.5, dated Dec. 9, 2019.
Esser, "Evaporation from Cell Culture Plates," Nunc Laboratories, retrieved from URL:https://www.tabaslab.com/protocols/evap.pdf, Sep. 1, 2004, pp. 1-3 (4 pages total).
Extended European Search Report for corresponding European Application No. 16891643.5, dated Feb. 5, 2019.
Leica, "Leica Adaptive Focus Control," retrieved from URL:https://www.leica-microsystems.com/fileadmin/downloads/Leica%20DMi8%20for%20Advanaced%20Imaging/Brochures/Lecia_DMi8_AFC-Flyer_en.pdf, Nov. 25, 2015, 2 pages.
Olympus, "IX81-ZDC Focus Drift Compensating Microscope Instructions," retrieved from URL:http://neurodiscovery.harvard.edu/files/hndc/files/ix81_zdc.pdf, Jan. 28, 2010, pp. 1-8 (11 pages total).
Rondeau, "CRISP Autofocus Instruction Manual," retrieved from URL:https://loci.wisc.edu/sites/default/files/2016-09/CRISP%20Autofocus%20Manual.pdf, Apr. 19, 2013, pp. 1-29.
International Preliminary Report on Patentability and Written Opinion of the International Searching Authority (Form PCT/IB/326, PCT/IB/373 and PCT/ISA/237) for International Application No. PCT/JP2016/086151, dated Sep. 7, 2018, with English translation.
International Search Report (Forms PCT/ISA/210 and PCT/ISA/220) for International Application No. PCT/JP2016/086151, dated Mar. 14, 2017, with English translation.
Japanese Notification of Reasons for Refusal for corresponding Japanese Application No. 2016-035618, dated Sep. 25, 2018, with English translation.

\* cited by examiner

| TYPE OF CULTURE CONTAINER | THICKNESS OF BOTTOM PORTION |
|---|---|
| CONTAINER 1 | d1 |
| CONTAINER 2 | d2 |
| CONTAINER 3 | d3 |
| ⋮ | ⋮ |

MICROSCOPE AND OBSERVATION METHOD

CROSS-REFERENCE TO RELATED APPLICATIONS

This application is a Continuation of PCT International Application No. PCT/JP2016/086151 filed on Dec. 6, 2016, which claims priority under 35 U.S.C § 119(a) to Japanese Patent Application No. 2016-035618 filed on Feb. 26, 2016. Each of the above application(s) is hereby expressly incorporated by reference, in its entirety, into the present application.

BACKGROUND OF THE INVENTION

1. Field of the Invention

The present invention relates to a microscope for imaging an observation target in a liquid and an observation method.

2. Description of the Related Art

In recent years, various microscopes including a phase contrast microscope are widely used as microscopes for observing cultured cells, such as stem cells.

In the case of observing cells using a microscope, the size of a cell is several tens of micrometers, whereas the part to be observed is several tens of millimeters that is a wide region. Therefore, a stage on which a container containing cells is provided is moved in a two-dimensional manner in the horizontal direction to perform scanning measurement.

In the case of performing scanning measurement by moving the stage in this manner, in order to acquire a clear image for each field of view (imaging region), it is necessary to perform focus adjustment for each field of view.

As a technique for performing focus adjustment quickly and easily, for example, JP2013-190680A has proposed an autofocus control method for illuminating an observation target with autofocus (AF) light having a wavelength different from illumination light and observation light and measuring the reflected light to determine a focal position.

SUMMARY OF THE INVENTION

However, in the case of observing cells contained in a culture container together with a culture solution, an appropriate focal position may not be able to be determined depending on the type of culture container, the amount of culture solution, the magnification of an objective lens, and the like.

Specifically, as shown in FIG. 3, in the case of observing cells contained in a culture container 60, it is desirable to focus on an observation target placement surface P1, which is a boundary surface between an observation target S (cell) and a bottom portion of the culture container 60. In this case, it is desirable to separately detect the detection signal of reflected light L1 that is reflected from the observation target placement surface P1. However, for example, in a case where the thickness d of the bottom portion of the culture container 60 is small, a detection signal based on the reflected light L1 from the observation target placement surface P1 and a detection signal based on reflected light L2 from a bottom surface P2 of the culture container 60 cannot be separately detected. Therefore, focusing on the observation target placement surface P1 may not be possible.

Even in a case where the amount of culture solution C is small and the distance between a liquid surface P3 of the culture solution C and the observation target placement surface P1 is short, the detection signal based on the reflected light L1 from the observation target placement surface P1 and the detection signal based on reflected light L3 from the liquid surface P3 of the culture solution C cannot be separately detected. Therefore, focusing on the observation target placement surface P1 may not be possible.

In a case where the magnification of the objective lens is low, the focal depth is large. Therefore, focusing on the observation target placement surface P1 may be difficult.

In view of the aforementioned problems, it is an object of the present invention to provide a microscope and an observation method capable of appropriately focusing on an observation target placement surface without being affected by the type of culture container, the amount of culture solution, and the magnification of an objective lens.

A microscope of the present invention comprises: an illumination light emission unit that emits illumination light to a container containing a liquid and an observation target; a container support unit on which the container is placed and which supports the container; an objective lens on which the illumination light having passed through the container and the container support unit is incident; a focusing light emission unit that emits focusing light having a wavelength different from that of the illumination light from the container support unit side through the objective lens; a reflected light detection unit that detects reflected light, which is due to emission of the focusing light from the container support unit side, through the objective lens; a distance changing unit that changes a distance between the objective lens and the container support unit; an autofocus control unit that performs autofocus control by controlling the distance changing unit based on the reflected light detected by the reflected light detection unit; and a focus control information acquisition unit that acquires focus control information including at least one of information of the container, information of an amount of the liquid, or information of a magnification of the objective lens. The autofocus control unit changes a method of the autofocus control based on the focus control information.

In the microscope of the present invention described above, the autofocus control unit can perform switching between first autofocus control, which is for searching for a focal position formed on an observation target placement surface that is a boundary surface between a bottom portion of the container and the observation target, and second autofocus control, which is for searching for a focal position focused on a bottom surface that is a surface of the bottom portion of the container opposite to the observation target placement surface, based on the focus control information.

In the microscope of the present invention described above, the autofocus control unit can estimate a focal position focused on the observation target placement surface by adding an offset to the focal position searched for by the second autofocus control and control the distance changing unit based on the estimated focal position.

In the microscope of the present invention described above, based on the information of the amount of the liquid, the autofocus control unit can perform the first autofocus control in a case where the amount of the liquid is equal to or greater than a liquid threshold value set in advance and perform the second autofocus control in a case where the amount of the liquid is less than the liquid threshold value.

In the microscope of the present invention described above, based on the information of the container, the autofocus control unit can perform the first autofocus control in a case where a thickness of the bottom portion of the container is equal to or greater than a thickness threshold value set in advance and perform the second autofocus control in a case where the thickness of the bottom portion of the container is less than the thickness threshold value.

In the microscope of the present invention described above, based on the information of the magnification of the objective lens, the autofocus control unit can perform the first autofocus control in a case where the magnification of the objective lens is a relatively high magnification and perform the second autofocus control in a case where the magnification of the objective lens is a relatively low magnification.

In the microscope of the present invention described above, the focus control information acquisition unit can acquire information of a culture period of the observation target as the information of the amount of the liquid.

In the microscope of the present invention described above, it is possible to further comprise a thickness measurement unit that measures a thickness of a bottom portion of the container as the information of the container.

In the microscope of the present invention described above, it is possible to further comprise a setting input receiving unit that receives a setting input of the focus control information.

In the microscope of the present invention described above, it is preferable that the focusing light has a pattern set in advance.

In the microscope of the present invention described above, it is preferable that the focusing light has a stripe pattern.

An observation method of the present invention is an observation method for observing an image of an observation target by emitting illumination light to a container, which is placed on a container support unit and which contains a liquid and the observation target, and imaging the illumination light, which has passed through the container and the container support unit, through an objective lens. The method comprises: emitting focusing light having a wavelength different from that of the illumination light from the container support unit side through the objective lens; in detecting reflected light due to emission of the focusing light and performing autofocus control by changing a distance between the objective lens and the container support unit based on the detected reflected light, acquiring focus control information including at least one of information of the container, information of an amount of the liquid, or information of a magnification of the objective lens; and changing a method of the autofocus control based on the acquired focus control information.

According to the microscope and the observation method of the present invention, the focusing light is emitted to the container through the objective lens, the reflected light due to emission of the focusing light is detected, and autofocus control is performed by changing the distance between the objective lens and the container holding unit holding the container based on the detected reflected light. Then, in the case of performing such autofocus control, focus control information including at least one of the information of the container, the information of the amount of the liquid, or the information of the magnification of the objective lens is acquired, and the method of the autofocus control is changed based on the acquired focus control information. By changing the method of the autofocus control in this manner, it is possible to perform autofocus control in consideration of the type of culture container, the amount of culture solution, and the magnification of the objective lens. As a result, it is possible to appropriately focus on the observation target placement surface.

DESCRIPTION OF THE PREFERRED EMBODIMENTS

Figure 1:
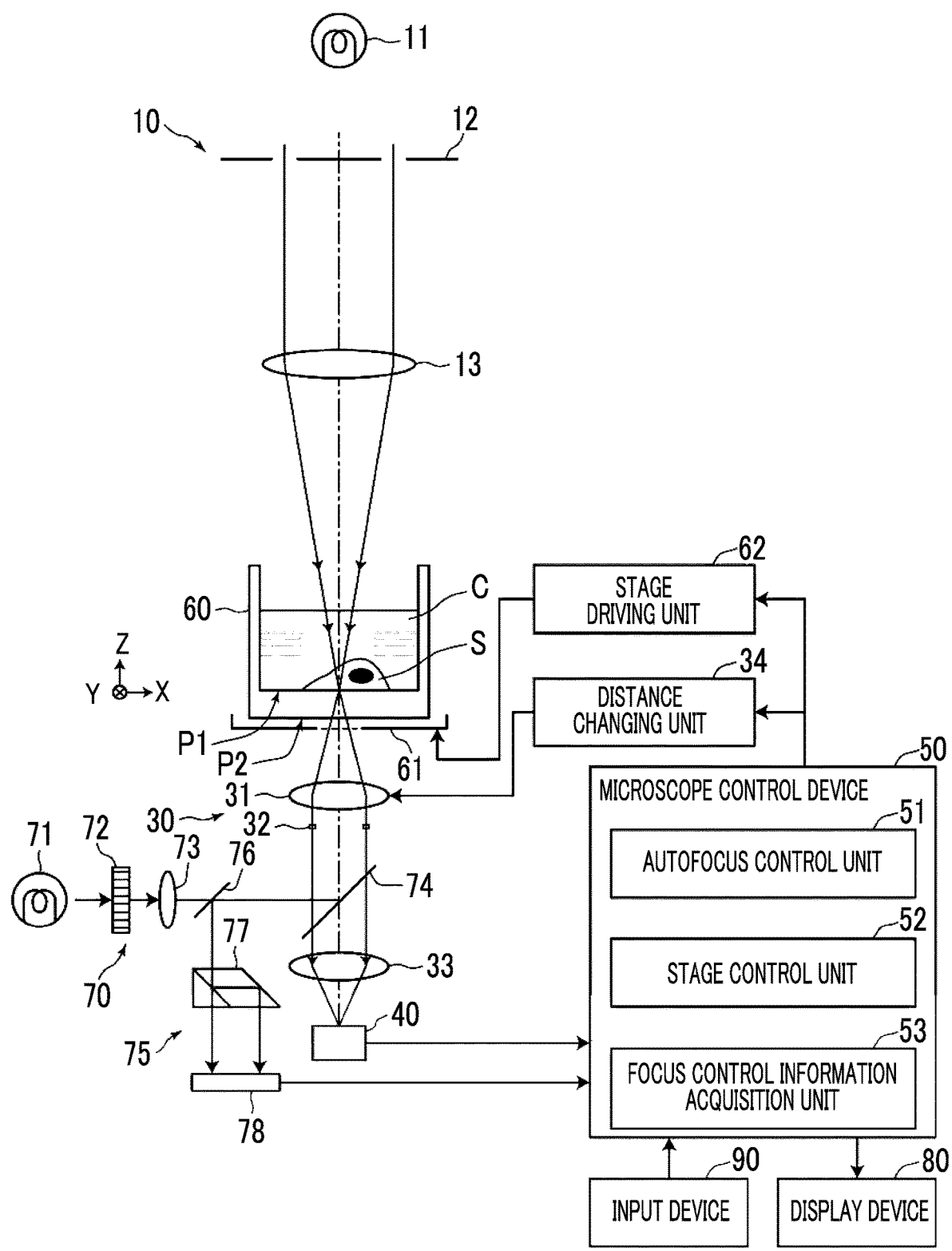
FIG. 1 is a diagram showing the schematic configuration of a microscope system using an embodiment of a microscope of the present invention.

Hereinafter, a microscope system using an embodiment of a microscope and an observation method of the present invention will be described in detail with reference to the diagrams. FIG. 1 is a diagram showing the schematic configuration of the microscope system of the present embodiment.

As shown in FIG. 1, the microscope system of the present embodiment includes an illumination light emission unit 10, an imaging optical system 30, an imaging unit 40, a focusing light emission unit 70, a reflected light detection unit 75, a microscope control device 50, a display device 80, and an input device 90.

In the microscope system of the present embodiment, a stage 61 corresponding to a container support unit is provided between the illumination light emission unit 10 and the imaging optical system 30, and a culture container 60 is supported by being placed on the stage 61. In the culture container 60, a culture solution C that is a liquid and an observation target S are contained.

The microscope system of the present embodiment includes a stage driving unit 62 for moving the stage 61 in X, Y, and Z directions. The X and Y directions are directions perpendicular to each other on a plane parallel to an observation target placement surface P1, and the Z direction is a direction perpendicular to the X and Y directions.

In the microscope system of the present embodiment, a phase contrast microscope body is formed by the illumination light emission unit 10, the imaging optical system 30, the imaging unit 40, the focusing light emission unit 70, the reflected light detection unit 75, the stage 61, and the stage driving unit 62 that have been described above and a distance changing unit 34, and the microscope control device 50 controls the phase contrast microscope body. Hereinafter, the specific configuration of the phase contrast microscope body will be described.

The illumination light emission unit 10 emits illumination light for so-called phase difference measurement to the observation target S contained in the culture container 60. In the present embodiment, the illumination light emission unit 10 emits ring-shaped illumination light as the illumination light for phase difference measurement. Specifically, the illumination light emission unit 10 of the present embodiment includes: a white light source 11 that emits white light for phase difference measurement; a slit plate 12 which has a ring-shaped slit, on which the white light emitted from the white light source 11 is incident, and which emits ring-shaped illumination light; and a condenser lens 13 on which the ring-shaped illumination light emitted from the slit plate 12 is incident and which emits the incident ring-shaped illumination light to the observation target S.

The slit plate 12 is obtained by providing a ring-shaped slit, through which white light is transmitted, on a light screen for shielding the white light emitted from the white light source 11. The white light passes through the slit to form ring-shaped illumination light.

In the present embodiment, the ring-shaped illumination light is formed using the slit plate 12 as described above, but the method of forming the ring-shaped illumination light is not limited thereto. For example, the ring-shaped illumination light may be formed using a spatial light modulation element or the like.

In the present embodiment, the ring-shaped illumination light is used as illumination light for phase difference measurement, but illumination light having a structure other than the ring shape may be used. Other shapes, such as a triangular shape or a quadrangular shape, may be used as long as the illumination light has a conjugate shape with a phase plate 32 to be described later.

In the culture container 60 placed on the stage 61, a cell group or the like is disposed as the observation target S. In the present embodiment, the boundary surface between the bottom portion of the culture container 60 and the observation target S is referred to as the observation target placement surface P1. The surface of the bottom portion of the culture container 60 opposite to the observation target placement surface P1 is referred to as a bottom surface P2. Examples of the culture container 60 include a Petri dish and a well plate in which a plurality of wells are arranged. In the case of a well plate, the observation target S and the culture solution C are contained in each well.

In the present embodiment, a cell group cultured in the culture solution is set as the observation target S. However, the observation target S is not limited to cells in the culture solution, and cells fixed in a liquid, such as water, formalin, ethanol, and methanol, may be set as the observation target S.

The imaging optical system 30 includes an objective lens 31, the phase plate 32, an imaging lens 33, and the distance changing unit 34.

The phase plate 32 is configured by forming a phase ring on a transparent plate that is transparent for the wavelength of the ring-shaped illumination light. In addition, the size of the slit of the slit plate 12 described above and the phase ring are in the conjugate relationship.

The phase ring is obtained by forming a phase film, which shifts the phase of incident light by ¼ wavelength, and a dimming filter, which is for attenuating the incident light, in a ring shape. Direct light incident on the phase plate 32 is transmitted through the phase ring. As a result, the phase of the direct light is shifted by ¼ wavelength, and the brightness is weakened. On the other hand, most of the diffracted light diffracted by the observation target S passes through a transparent plate portion of the phase plate 32. Accordingly, the phase and the brightness are not changed.

The objective lens 31 is moved in the Z direction by the distance changing unit 34. In the case of capturing the phase difference image of the observation target S, autofocus control is performed by moving the objective lens 31 in the Z direction using the distance changing unit 34, so that the contrast of the image captured by the imaging unit 40 is adjusted.

In the present embodiment, pattern light is emitted to the culture container 60 by the focusing light emission unit 70, reflected light thereof is detected by the reflected light detection unit 75, and autofocus control is performed based on the detection signal. The autofocus control based on the detection signal of the reflected light of the pattern light will be described in detail later.

Direct light and diffracted light having passed through the phase plate 32 are incident on the imaging lens 33, and these light beams are imaged on the imaging unit 40.

The distance changing unit 34 includes a mechanism for moving the objective lens 31 in the Z direction as described above, and corresponds to a distance changing unit of the present invention.

The imaging optical system 30 may be configured so that its optical magnification can be changed. As a method of changing the optical magnification, for example, a plurality of objective lenses 31 having different magnifications may be provided in the imaging optical system 30, and the plurality of objective lenses 31 may be automatically switched. In this case, the phase plate 32 is also changed according to the change of the objective lens 31. The optical magnification may also be changed by manually exchanging the objective lens 31 by the user.

The imaging unit 40 includes an imaging element for capturing a phase difference image of the observation target S formed by the imaging lens 33. As the imaging element, a charge-coupled device (CCD) image sensor, a complementary metal-oxide semiconductor (CMOS) image sensor, and the like can be used.

The focusing light emission unit 70 is used for autofocus control as described above, and emits pattern light having a pattern set in advance, as focusing light, to the culture container 60. Specifically, the focusing light emission unit 70 of the present embodiment emits pattern light having a stripe pattern, and includes: a near-infrared light source 71 that emits near-infrared light; a grid 72 configured to include a linear portion that transmits near-infrared light emitted from the near-infrared light source 71 and a linear portion that shields the near-infrared light emitted from the near-infrared light source 71; an emission lens 73; and a dichroic mirror 74 that reflects pattern light having a pattern of bright and dark stripes emitted from the grid 72 toward the culture container 60 and transmits illumination light for phase difference measurement.

Although near-infrared light is used as the pattern light in the present embodiment, the wavelength of the pattern light is not limited thereto, and other wavelengths may be used as long as the wavelength is different from the illumination light for phase difference measurement.

In the present embodiment, pattern light having a striped bright and dark pattern is formed using the grid 72, but the method of forming the pattern light is not limited thereto. For example, striped bright and dark patterns may be formed using a spatial light modulation element or the like. The bright and dark pattern of the pattern light is not limited to the stripe pattern, and a grid pattern in which bright and dark patterns are periodically arranged in a two-dimensional manner may be used. Light in which bright and dark patterns are concentrically arranged or light in which dot patterns are arranged in a two two-dimensional manner may be used as pattern light. The pattern of the pattern light may not be a black-and-white pattern, and may be a color pattern formed of different colors.

The reflected light detection unit 75 detects reflected light due to emission of the pattern light to the culture container 60. Specifically, the reflected light detection unit 75 of the present embodiment includes a half mirror 76, an optical path difference prism 77, and a line sensor 78.

The half mirror 76 transmits the pattern light emitted from the grid 72, and reflects the reflected light due to emission of the pattern light to the culture container 60 in a direction of the optical path difference prism 77.

The optical path difference prism 77 divides the reflected light of the incident pattern light into two optical paths, and forms an image at two different places of the line sensor 78. The line sensor 78 outputs first and second detection signals, which are obtained by imaging at the two places, to the autofocus control unit 51 of the microscope control device 50. In the present embodiment, the reflected light beams of the two optical paths divided by the optical path difference prism 77 are detected by one line sensor 78. However, two sensors that individually detect the reflected light of each optical path may be provided.

The microscope control device 50 is a computer including a central processing unit (CPU), a semiconductor memory, a hard disk, and the like.

The microscope control device 50 controls the operation of the entire phase contrast microscope body. Specifically, as shown in FIG. 1, the microscope control device 50 includes the autofocus control unit 51 that controls the distance changing unit 34, a stage control unit 52 that controls the stage driving unit 62, and a focus control information acquisition unit 53.

The autofocus control unit 51 performs autofocus control by moving the objective lens 31 in the Z direction based on the first and second detection signals detected by the line sensor 78 of the reflected light detection unit 75. Specifically, the autofocus control unit 51 of the present embodiment determines a focal position by moving the objective lens 31 to a position where the contrast (waveform pattern) of the first detection signal and the contrast (waveform pattern) of the second detection signal are approximated to each other. Although the first and second detection signals are detected using the line sensor 78 in the present embodiment, a CMOS image sensor or a CCD image sensor may be used without being limited thereto.

The stage control unit 52 controls the driving of the stage driving unit 62 to move the stage 61 in the X, Y, and Z directions. By moving the stage 61 in the X and Y directions, for example, the inside of one well is scanned with illumination light for phase difference measurement, and a phase difference image is captured for each of a plurality of imaging regions (field of view) divided in one well.

The focus control information acquisition unit 53 acquires at least one focus control information of the information of the culture container 60, the information of the amount of the culture solution C, or the information of the magnification of the objective lens 31.

Figures 2, 3:
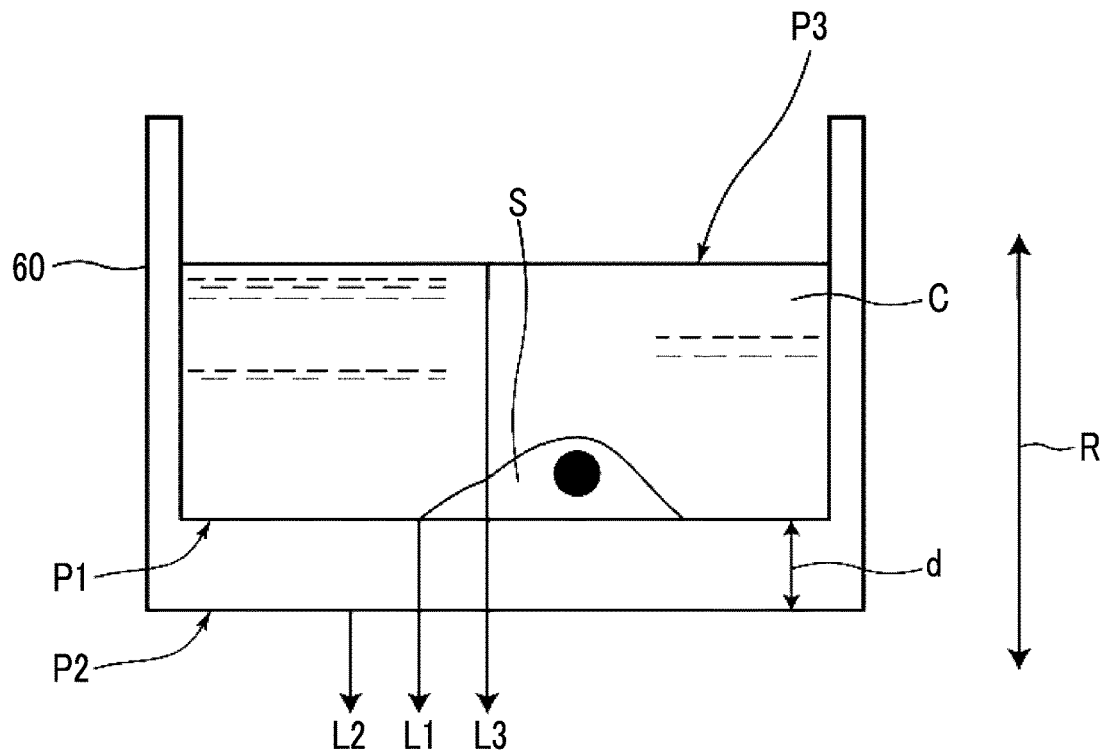
FIG. 2 is a diagram showing an example of a table in which the type of culture container and the thickness of a bottom portion of the culture container are associated with each other.
FIG. 3 is a diagram illustrating reflected light reflected by emitting pattern light to a culture container.

The information of the culture container 60 may be any information as long as the information is information relevant to the thickness of the bottom portion of the culture container 60. For example, the information of the culture container 60 may be information indicating the type of the culture container 60, such as the name, manufacturer or model number of the culture container 60, or may be numerical information directly indicating the thickness of the bottom portion of the culture container 60. In the case of acquiring information of the type of the culture container 60, a table in which the information of the type of the culture container 60 and the thickness of the bottom portion of the culture container 60 are associated with each other may be set in advance as shown in FIG. 2, and the thickness of the bottom portion of the culture container 60 may be acquired with reference to the above table at the time of determining an autofocus control method to be described later and at the time of second autofocus control.

The information of the culture container 60 may be set and input by the user using the input device 90. Alternatively, a recording medium, such as a barcode or an integrated circuit (IC) chip in which the information of the culture container 60 is recorded may be provided in the culture container 60, and the information of the culture container 60 may be acquired by reading from the recording medium. The input device 90 corresponds to a setting input receiving unit of the present invention.

The information of the amount of the culture solution C may be set and input by the user using the input device 90. Alternatively, a weight sensor (not shown) may be provided on the stage 61 or the like, and the amount of the culture solution C may be calculated by measuring the weight using the weight sensor. The information of the amount of the culture solution C is acquired as information indirectly indicating the depth of the culture solution C.

The information of the magnification of the objective lens 31 may be set and input by the user using the input device 90. Alternatively, a recording medium, such as a barcode or an integrated circuit (IC) chip in which the magnification of the objective lens 31 is recorded may be provided in the objective lens 31, and the information of the magnification of the objective lens 31 may be acquired by reading from the recording medium.

The focus control information acquired by the focus control information acquisition unit 53 is acquired by the autofocus control unit 51, and the autofocus control unit 51 changes the autofocus control method based on the input focus control information. Specifically, the autofocus control unit 51 of the present embodiment performs switching between the first autofocus control and the second autofocus control based on the input focus control information. Hereinafter, the first autofocus control and the second autofocus control will be described.

The autofocus control unit 51 basically performs the autofocus control based on the detection signal of the reflected light due to emission of pattern light. However, as described above, as reflecting surfaces on which the pattern light is reflected, there are the observation target placement surface P1, the bottom surface P2 of the culture container 60, and the liquid surface P3 of the culture solution C as shown in FIG. 3.

The autofocus control unit 51 sequentially acquires the first and second detection signals of the reflected light of the pattern light while moving the objective lens 31 in the Z direction, and sequentially determines whether or not the contrasts (waveform patterns) of these detection signals are approximated to each other, thereby searching for a focal position.

Here, in order to capture a clearer phase difference image of the observation target S, it is desirable to focus on the observation target placement surface P1. In a case where the thickness d of the bottom portion of the culture container 60 is sufficiently large and the amount of the culture solution C is sufficiently large, that is, the distance between the liquid surface P3 of the culture solution C and the observation target placement surface P1 is sufficiently long, a stronger detection signal can be detected in a case where the focal position is formed on each surface of the observation target placement surface P1, the bottom surface P2 of the culture container 60, and the liquid surface P3 of the culture solution C than in a case where the focal position is formed in the other range, for example, by moving the focal position of the objective lens 31 in the range of an arrow R shown in FIG. 3.

That is, it is possible to separately detect a detection signal based on the reflected light L1 from the observation target placement surface P1, a detection signal based on the reflected light L2 from the bottom surface P2 of the culture container 60, and a detection signal based on the reflected light L3 from the liquid surface P3 of the culture solution C. Therefore, the autofocus control unit 51 can determine that the focal position is focused on each surface of the observation target placement surface P1, the bottom surface P2 of the culture container 60, and the liquid surface P3 of the culture solution C. That is, it is possible to focus on the observation target placement surface P1.

However, for example, in a case where the thickness d of the bottom portion of the culture container 60 is small, the detection time point of the detection signal based on the reflected light L1 from the observation target placement surface P1 and the detection time point of the detection signal based on the reflected light L2 from the bottom surface P2 of the culture container 60 become very close to each other in a case where the focal position of the objective lens 31 is moved in the range of the arrow R shown in FIG. 3. Accordingly, since these detection signals cannot be separately detected, it is not possible to focus on the observation target placement surface P1.

Even in a case where the amount of culture solution C is small and the distance between a liquid surface P3 of the culture solution C and the observation target placement surface P1 is short, the detection time point of the detection signal based on the reflected light L1 from the observation target placement surface P1 and the detection time point of the detection signal based on the reflected light L3 from the liquid surface P3 of the culture solution C become very close to each other in a case where the focal position of the objective lens 31 is moved in the range of the arrow R shown in FIG. 3. Accordingly, since these detection signals cannot be separately detected, it is not possible to focus on the observation target placement surface P1.

Therefore, the autofocus control unit 51 of the present embodiment performs first autofocus control to search for a focal position focused on the observation target placement surface P1 in a case where the thickness d of the bottom portion of the culture container 60 is equal to or greater than a thickness threshold value set in advance, and performs second autofocus control different from the first autofocus control in a case where the thickness d of the bottom portion of the culture container 60 is less than the thickness threshold value.

In addition, the autofocus control unit 51 performs the first autofocus control described above in a case where the amount of the culture solution C is equal to or greater than a liquid threshold value set in advance, and performs the second autofocus control different from the first autofocus control in a case where the amount of the culture solution C is less than the liquid threshold value.

In the case of performing the second autofocus control, the autofocus control unit 51 estimates a focal position focused on the observation target placement surface P1 by searching for a focal position focused on the bottom surface P2 of the culture container 60 and adding an offset to the searched focal position.

As described above, in a case where the thickness d of the bottom portion of the culture container 60 is small, it is not possible to separately detect the detection signal based on the reflected light L1 from the observation target placement surface P1 and the detection signal based on the reflected light L2 from the bottom surface P2 of the culture container 60. However, since the bottom surface P2 of the culture container 60 does not depend on the state of the observation target S or the like, the detection signal based on the reflected light L2 from the bottom surface P2 can be detected more accurately than the detection signal based on the reflected light L1 from the observation target placement surface P1.

Therefore, in the second autofocus control, a focal position focused on the observation target placement surface P1 is estimated by searching for a focal position formed on the bottom surface P2 of the culture container 60 and adding an offset corresponding to the thickness d of the bottom portion of the culture container 60 to the searched focal position. It is desirable to acquire the above offset from the information of the culture container 60 acquired as the focus control information. However, the present invention is not limited thereto, and a value set in advance may be used, or the user may set and input a value using the input device 90.

Then, in the second autofocus control, the objective lens 31 is moved so that the focal position of the objective lens 31 comes to the focal position estimated as described above.

The autofocus control unit 51 performs switching between the first autofocus control and the second autofocus control based on the magnification of the objective lens 31. Specifically, the first autofocus control is performed in a case where the magnification of the objective lens 31 is a relatively high magnification, and the second autofocus control is performed in a case where the magnification of the objective lens 31 is a relatively low magnification. Specifically, for example, the first autofocus control is performed in a case where the objective lens 31 having a magnification of 20 times is used, and the second autofocus control is performed in a case where the objective lens 31 having a magnification of 4 times is used. Here, the relatively high magnification of the objective lens 31 is a magnification higher than 4 times, and the relatively low magnification is a magnification equal to or less than 4 times.

The reason why the first autofocus control and the second autofocus control are switched depending on the magnification of the objective lens 31 as described above is that the focal depth changes with the magnification of the objective lens 31. That is, in a case where the magnification of the objective lens 31 is a relatively high magnification, the focal depth of the objective lens 31 is small. Accordingly, it is possible to accurately search for the focal position of the observation target placement surface P1. However, in a case where the magnification of the objective lens 31 is a relatively low magnification, the focal depth of the objective lens 31 is large. Accordingly, it is not possible to accurately search for the focal position of the observation target placement surface P1. In a case where the magnification of the objective lens 31 is a relatively low magnification, the second autofocus control to search for a focal position focused on the bottom surface P2 of the culture container 60 is performed.

Referring back to FIG. 1, the input device 90 and the display device 80 are connected to the microscope control device 50. The input device 90 includes an input device, such as a keyboard or a mouse, and receives a setting input from the user. In particular, the input device 90 in the present embodiment receives setting inputs of information of the culture container 60, information of the amount of the culture solution C, and information of the magnification of the objective lens 31 described above.

The display device 80 is a display device, such as a liquid crystal display, and displays a phase difference image or the like captured by the imaging unit 40. The display device 80 may also be used as the input device 90 by using a touch panel as the display device 80.

Figure 4:
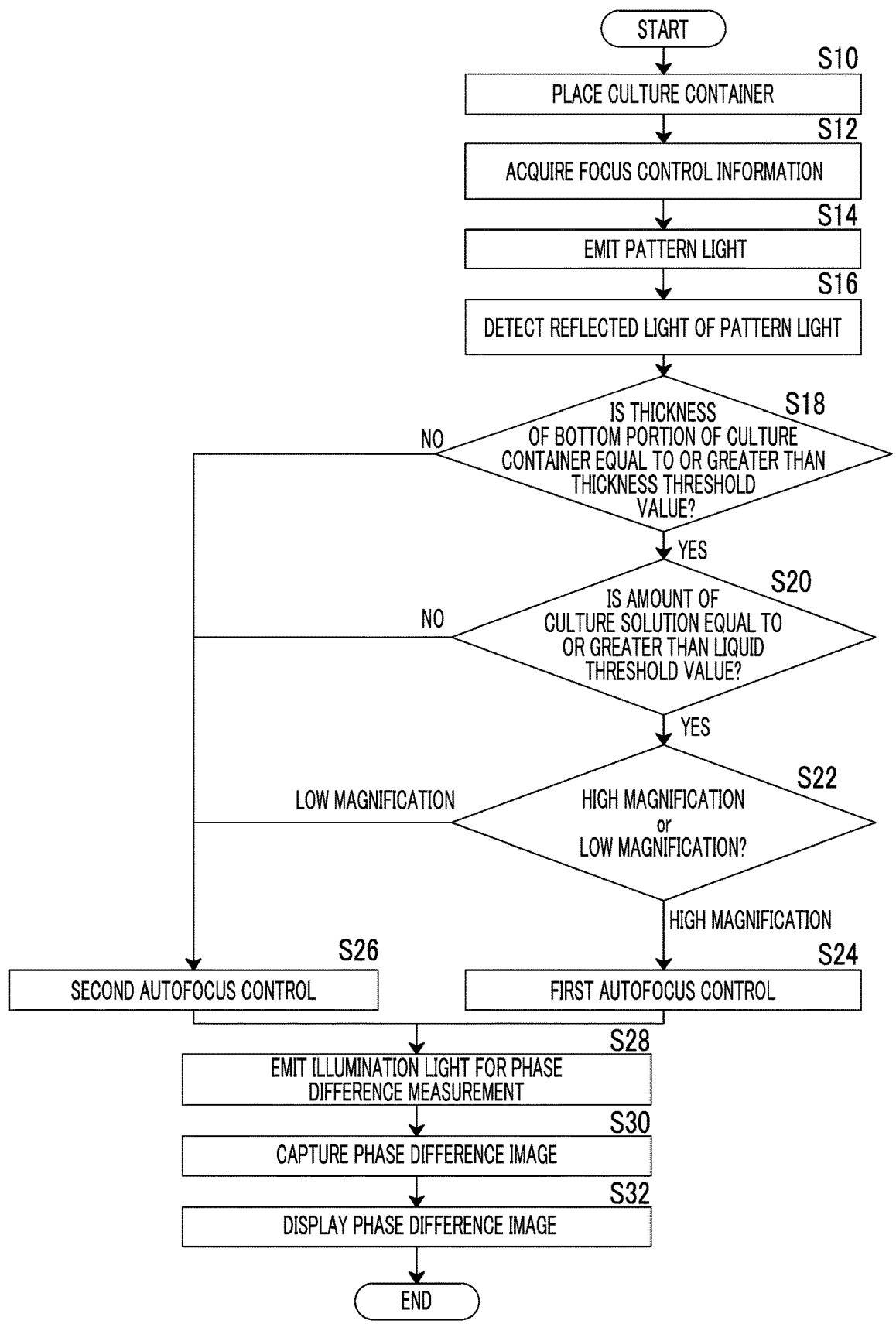
FIG. 4 is a flowchart illustrating the operation of the microscope system using an embodiment of the microscope of the present invention.

Next, the operation of the microscope system of the present embodiment will be described with reference to the flowchart shown in FIG. 4.

First, the culture container 60 in which the observation target S and the culture solution C are contained is placed on the stage 61 (S10). Then, focus control information including the information of the culture container 60, the information of the amount of the culture solution C, and the information of the magnification of the objective lens 31 is acquired (S12).

Then, pattern light is emitted from the stage 61 side through the objective lens 31 by the focusing light emission unit 70 (S14), and reflected light due to the emission of the pattern light is detected by the reflected light detection unit 75 (S16). Then, the detection signal detected by the reflected light detection unit 75 is input to the autofocus control unit 51.

The autofocus control unit 51 performs autofocus control based on the input detection signal. In this case, switching between the first autofocus control and the second autofocus control is performed based on the input focus control information.

Specifically, in a case where the thickness of the bottom portion of the culture container 60 is equal to or greater than the thickness threshold value set in advance (S18, YES), the amount of the culture solution C is equal to or greater than the liquid threshold value set in advance (S20, YES), and the magnification of the objective lens 31 is set to a relatively high magnification (S22, YES), the autofocus control unit 51 performs the first autofocus control (S24). On the other hand, in a case where the thickness of the bottom portion of the culture container 60 is less than the thickness threshold value set in advance (S18, NO), the amount of the culture solution C is less than the liquid threshold value set in advance (S20, NO), or the magnification of the objective lens 31 is set to a relatively low magnification (S22, NO), the autofocus control unit 51 performs the second autofocus control.

Then, after the first autofocus control or the second autofocus control is performed by the autofocus control unit 51, ring-shaped illumination light is emitted from the illumination light emission unit 10 toward the culture container 60 (S28), and a phase difference image of the observation target S of the culture container 60 is captured (S30).

The phase difference image of the observation target S captured by the imaging unit 40 is output to the microscope control device 50, and the microscope control device 50 displays the input phase difference image on the display device 80.

According to the microscope system of the embodiment described above, focus control information including at least one of the information of the culture container 60, the information of the amount of the culture solution C, or the information of the magnification of the objective lens 31 is acquired, and the method of autofocus control is changed based on the acquired focus control information. Therefore, since it is possible to perform autofocus control in consideration of the type of the culture container 60, the amount of the culture solution C, and the magnification of the objective lens 31, it is possible to appropriately focus on the observation target placement surface P1.

Figure 5:
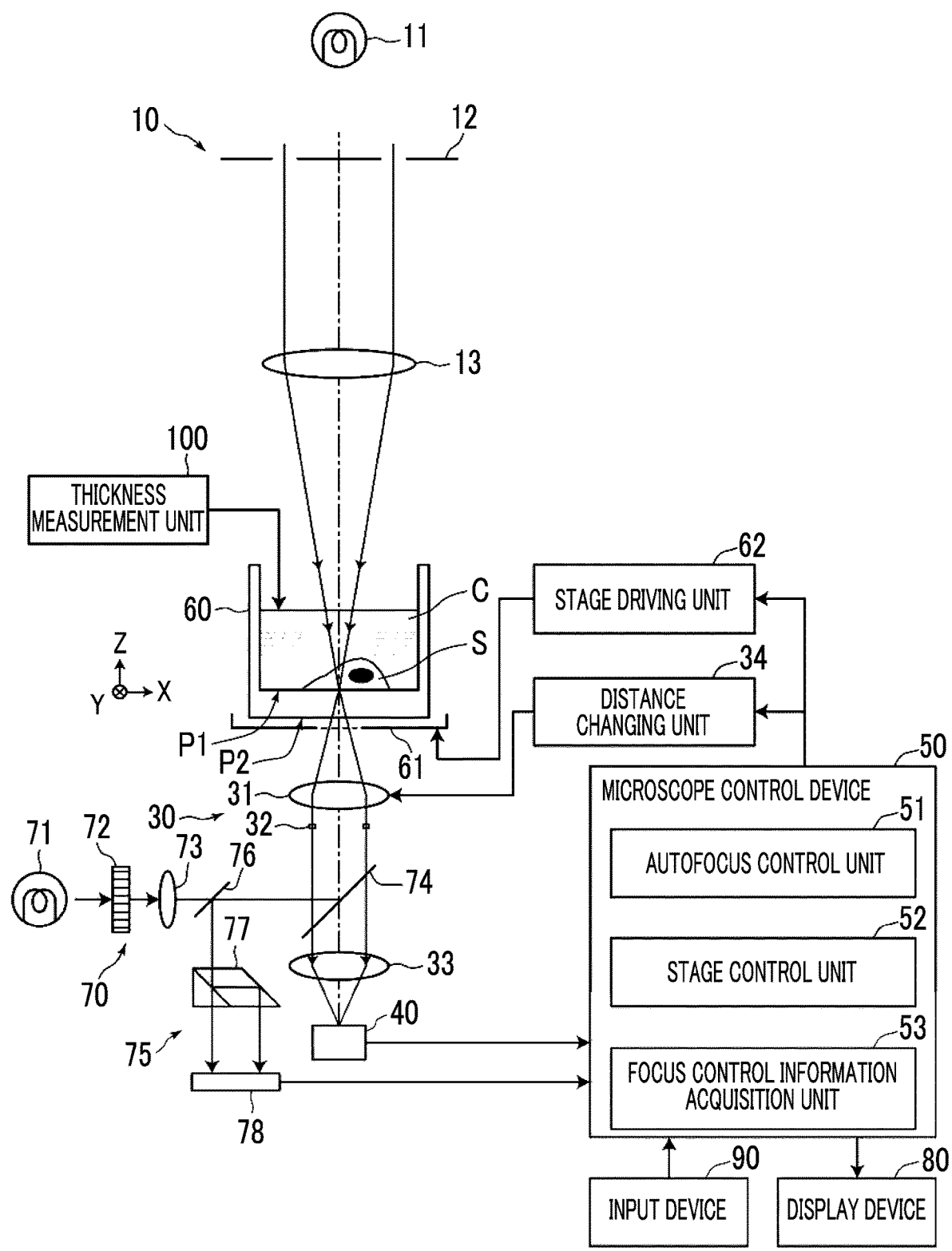
FIG. 5 is a diagram showing a modification example of the microscope system using an embodiment of the microscope of the present invention.

In the embodiment described above, the user sets and inputs the information of the culture container 60 to acquire the information of the thickness of the culture container 60. However, for example, a thickness measurement unit 100, such as a laser displacement meter for measuring the thickness of the bottom portion of the culture container 60, may be provided as shown in FIG. 5, and the focus control information acquisition unit 53 may acquire the thickness information measured by the thickness measurement unit 100 as the information of the culture container 60.

In a case where the above-described thickness measurement unit 100 is provided, the aforementioned autofocus control can also be performed for each imaging region in the case of capturing a phase difference image for each of a plurality of imaging regions divided within one well of the culture container 60. That is, in the present embodiment, as the stage 61 moves in the X and Y directions, for example, the inside of one well as the culture container 60 is scanned with illumination light for phase difference measurement, and a phase difference image for each of a plurality of imaging regions divided within one well is captured. However, the thickness information of the bottom portion of the culture container 60 for each imaging region measured by the thickness measurement unit 100 is acquired in advance as the information of the culture container 60, and the above-described autofocus control is performed for each imaging region. Therefore, even if there is a variation in the thickness of the bottom portion of the culture container 60 within one well, it is possible to perform autofocus control according to the thickness. As a result, it is possible to improve the image quality of the phase difference image.

As the information of the amount of the culture solution C, information of the culture period of the observation target S may be acquired. As the culture period increases, the culture solution C evaporates and its amount decreases. Therefore, a table in which the culture period and the amount of the culture solution C are associated with each other may be set in advance, a culture period set and input by the user or a culture period measured by a timer or the like may be acquired as the information of the amount of the culture solution C, and the amount of the culture solution may be acquired with reference to the above table.

As the information of the amount of the culture solution C, information of the depth of the culture solution C may be acquired using the thickness measurement unit 100 described above.

In the embodiment described above, the phase difference image formed by the imaging optical system 30 is captured by the imaging unit 40. However, an observation optical system or the like may be provided so that the user can directly observe the phase difference image of the observation target captured by the imaging optical system 30 without providing the imaging unit 40.

In the above embodiment, the present invention is applied to the phase contrast microscope. However, the present invention is not limited to the phase contrast microscope, but may be applied to other microscopes, such as a differential interference microscope and a bright field microscope.

EXPLANATION OF REFERENCES

10: illumination light emission unit
11: white light source

12: slit plate
13: condenser lens
30: imaging optical system
31: objective lens
32: phase plate
33: imaging lens
34: distance changing unit
40: imaging unit
50: microscope control device
51: autofocus control unit
52: stage control unit
53: focus control information acquisition unit
60: culture container
61: stage
62: stage driving unit
70: focusing light emission unit
71: near-infrared light source
72: grid
73: emission lens
74: dichroic mirror
75: reflected light detection unit
76: half mirror
77: optical path difference prism
78: line sensor
80: display device
90: input device
100: thickness measurement unit
C: culture solution
L1: reflected light
L2: reflected light
L3: reflected light
P1: observation target placement surface
P2: bottom surface
P3: liquid surface
S: observation target

What is claimed is:

1. A microscope, comprising:
an illumination light emission portion that emits illumination light to a container containing a liquid and an observation target;
a container support stage on which the container is placed and which supports the container;
an objective lens on which the illumination light having passed through the container and the container support stage is incident;
a focusing light emission portion that emits focusing light having a wavelength different from that of the illumination light from the container support stage side through the objective lens;
a reflected light detection portion that detects reflected light, which is due to emission of the focusing light from the container support stage side, through the objective lens;
a distance changing mechanism that changes a distance between the objective lens and the container support stage; and
a processor configured to:
perform autofocus control by controlling the distance changing mechanism based on the reflected light detected by the reflected light detection portion; and
acquire focus control information including at least one of information of the container, information of an amount of the liquid, or information of a magnification of the objective lens,
wherein the processor is further configured to change a method of the autofocus control based on the focus control information, and
wherein the processor is further configured to acquire information of a culture period of the observation target as the information of the amount of the liquid.

2. The microscope according to claim 1,
wherein the processor is further configured to perform switching between first autofocus control, which is for searching for a focal position focused on an observation target placement surface that is a boundary surface between a bottom portion of the container and the observation target, and second autofocus control, which is for searching for a focal position focused on a bottom surface that is a surface of the bottom portion of the container opposite to the observation target placement surface, based on the focus control information.

3. The microscope according to claim 2,
wherein the processor is further configured to estimate a focal position focused on the observation target placement surface by adding an offset to the focal position searched for by the second autofocus control, and control the distance changing mechanism based on the estimated focal position.

4. The microscope according to claim 3,
wherein, based on the information of the amount of the liquid, the processor is further configured to perform the first autofocus control in a case where the amount of the liquid is equal to or greater than a liquid threshold value set in advance and perform the second autofocus control in a case where the amount of the liquid is less than the liquid threshold value.

5. The microscope according to claim 4,
wherein, based on the information of the container, the processor is further configured to perform the first autofocus control in a case where a thickness of the bottom portion of the container is equal to or greater than a thickness threshold value set in advance and perform the second autofocus control in a case where the thickness of the bottom portion of the container is less than the thickness threshold value.

6. The microscope according to claim 4,
wherein, based on the information of the magnification of the objective lens, the processor is further configured to perform the first autofocus control in a case where the magnification of the objective lens is a relatively high magnification and perform the second autofocus control in a case where the magnification of the objective lens is a relatively low magnification.

7. The microscope according to claim 3,
wherein, based on the information of the container, the processor is further configured to perform the first autofocus control in a case where a thickness of the bottom portion of the container is equal to or greater than a thickness threshold value set in advance and perform the second autofocus control in a case where the thickness of the bottom portion of the container is less than the thickness threshold value.

8. The microscope according to claim 3,
wherein, based on the information of the magnification of the objective lens, the processor is further configured to perform the first autofocus control in a case where the magnification of the objective lens is a relatively high magnification and perform the second autofocus con-
trol in a case where the magnification of the objective lens is a relatively low magnification.

9. The microscope according to claim 2,
wherein, based on the information of the amount of the liquid, the processor further configured to perform the first autofocus control in a case where the amount of the liquid is equal to or greater than a liquid threshold value set in advance and perform the second autofocus control in a case where the amount of the liquid is less than the liquid threshold value.

10. The microscope according to claim 9,
wherein, based on the information of the container, the processor is further configured to perform the first autofocus control in a case where a thickness of the bottom portion of the container is equal to or greater than a thickness threshold value set in advance and perform the second autofocus control in a case where the thickness of the bottom portion of the container is less than the thickness threshold value.

11. The microscope according to claim 9,
wherein, based on the information of the magnification of the objective lens, the processor is further configured to perform the first autofocus control in a case where the magnification of the objective lens is a relatively high magnification and perform the second autofocus control in a case where the magnification of the objective lens is a relatively low magnification.

12. The microscope according to claim 2,
wherein, based on the information of the container, the processor is further configured to perform the first autofocus control in a case where a thickness of the bottom portion of the container is equal to or greater than a thickness threshold value set in advance and perform the second autofocus control in a case where the thickness of the bottom portion of the container is less than the thickness threshold value.

13. The microscope according to claim 12,
wherein, based on the information of the magnification of the objective lens, the processor is further configured to perform the first autofocus control in a case where the magnification of the objective lens is a relatively high magnification and perform the second autofocus control in a case where the magnification of the objective lens is a relatively low magnification.

14. The microscope according to claim 2,
wherein, based on the information of the magnification of the objective lens, the processor is further configured to perform the first autofocus control in a case where the magnification of the objective lens is a relatively high magnification and perform the second autofocus control in a case where the magnification of the objective lens is a relatively low magnification.

15. The microscope according to claim 1, further comprising:
a thickness measurement meter that measures a thickness of a bottom portion of the container as the information of the container.

16. The microscope according to claim 1, further comprising:
an input device that receives a setting input of the focus control information.

17. The microscope according to claim 1,
wherein the focusing light has a pattern set in advance.

18. The microscope according to claim 17
wherein the focusing light has a stripe pattern.

19. An observation method for observing an image of an observation target by emitting illumination light to a container, which is placed on a container support stage and which contains a liquid and the observation target, and imaging the illumination light, which has passed through the container and the container support stage, through an objective lens, the method comprising:
emitting focusing light having a wavelength different from that of the illumination light from the container support stage side through the objective lens;
in detecting reflected light due to emission of the focusing light and performing autofocus control by changing a distance between the objective lens and the container support stage based on the detected reflected light, acquiring focus control information including at least one of information of the container, information of an amount of the liquid, or information of a magnification of the objective lens;
acquiring information of a culture period of the observation target as the information of the amount of the liquid, and
changing a method of the autofocus control based on the acquired focus control information.

\* \* \* \* \*